Patented Sept. 26, 1950

2,524,017

UNITED STATES PATENT OFFICE 2,524,017

METALWORKING LUBRICANT

Robert T. Hance, Cincinnati, Ohio, and Harold C. O'Brien, Jr., Beaver, Pa., assignors, by mesne assignments, to Cincinnati Milling Machine Company, Cincinnati, Ohio, a corporation of Ohio No Drawing. Application December 4, 1944, Serial No. 566,636

9 Claims. (Cl. 252—33.4)

This invention is a continuation-in-part of our copending application, Serial No. 439,138, filed April 15, 1942, now abandoned.

This invention relates to the art of cooling, to an improved method of cooling tools such as grinding, cutting, milling, drilling, sawing, and boring tools, and the work being ground, cut, milled, drilled, sawed or bored; and to an improved coolant for use in such method.

Although intended for use with machine tools generally, the coolant of the present invention is particularly useful in the machining of metals. However, it has also been successfully used with machine tools operating on hard materials other than metals and including stone, ceramics, and concrete, as well as in the deep boring of hard woods such as oak or the like.

In the machine tool operations of grinding, cutting, milling, drilling, sawing or boring, heat is generated of such order as to produce high temperatures. For example, in metal cutting operations the generated heat may produce a temperature as high as 600° F. (316° C.) in the region of contact between the tool cutting edge and the metal stock or work. In metal stock grinding operations, temperatures as high as 2400° F. (1316° C.) may be developed. The conventional compounds used heretofore reduce these temperatures but generally not below the point where the metal being worked is blued by heat. These high-temperature tool and stock conditions are accompanied by numerous disadvantages. They may injure the surface structure of the metal work. Precision work and working to close tolerance is often prevented due to expansion of the metal stock and tool where high temperatures develop as a result of the machining operations. Hot chips may fly from the tool and provide serious hazards to the workmen. Thus, the speed of machine operations and the rate of feed of the work have been definitely limited by temperature rise resulting from the operations. The quantity of generated heat, as well as the resulting temperature, increases with increase in machine speed to accentuate the difficulties of the metal machining operations.

The discovery of the present invention marks an important advance in the art by minimizing, if not entirely eliminating, the heat rise difficulties. Actual use of the present coolant has demonstrated its remarkable effectiveness in metal grinding, cutting, drilling, sawing, and boring operations to cool the machine tool and work to such low temperature that the tool and work are maintained cool to the touch of the hand. Such low temperature (cool) condition of the tool and work is maintained by the present coolant even with the rate of machine operation and feed increased from 25 to 300 per cent over the speeds heretofore permissible with the use of conventional cutting fluids and materials. Thus, the present coolant effectively maintains machines, tools, and stock cool at substantially increased machine speed and feed, and exhibits superior cooling action under severe, high temperature-producing conditions. The coolant permits faster machine cutting on all types of metallic stock than has heretofore been possible. It also minimizes expansion of tool or work, thereby permitting precision working to closer tolerances than heretofore possible. The coolant avoids accidents due to hot chips or coils. It also keeps the machine, and coolant pump and supply lines clean. It removes all old oil, grease, grit, metallic particles and dirt. The coolant is clean to handle and will not irritate the skin. It insures longer tool life, keeps grinding wheels clean, and greatly reduces the frequency with which tools require sharpening or grinding and grinding wheels require redressing.

Since the coolant of this invention is inexpensive, as well as a remarkably effective cooling medium, it has wide application in the arts. A few of its many uses are given herein by way of illustration. Other uses of the coolant for the cooling of various heat producing systems will be readily understood. It has been used with remarkable success on such machine tools as grinding machines, lathes, boring mills, drills, and power saws.

The coolant is rapid in its action of abstracting heat from surfaces, tools, and work pieces to be either cooled or maintained at a desired low temperature, and shows remarkably high capacity for carrying away the heat of the contacted surfaces, tools and work.

In metal grinding, cutting, boring, drilling, sawing and other similar machine tool operations, the coolant of this invention is applied directly to the tool and work so that the engaging portions and adjacent surfaces of the tool and work are bathed in the coolant. The coolant may be supplied in the form of a spray or stream by a nozzle or the like, and is preferably directed onto the working end of the tool and that part of the work which is engaged by the tool. As the coolant flows from the tool and work, it may be collected in a suitable container or tank. From this tank the coolant may be pumped through supply lines to the discharge nozzles directed at the tool and metal stock. Thus the coolant may be continuously recirculated and used repeatedly for cooling the machine tool and metal stock. If desired, suitable means may be provided in the circulatory system for removing from the coolant any metallic or other particles that may have been collected. Heat accumulated in the coolant is ordinarily dissipated by conduction and/or radiation although special cooling means may be employed.

Use of this coolant in a wide range of machine tool operations, under practical working conditions, has permitted the speed of operation of the tools, as well as the rate of feed, to be substantially increased over prior practice. With such increased speed of feed and tool operation, the coolant assures accurate work with better finish to metal parts than is secured under prior practices which necessarily proceeded at slower speeds. It has also been found that even with substantially increased speed of feed and tool operation, both the tool and work are maintained by the present coolant at a remarkably low and greatly reduced temperature (cool to the touch). It is, of course, to be understood that the present coolant is superior to prior cutting compounds and oils regardless of whether the machines are operated at the increased speeds now possible or at the speed practiced heretofore.

The coolant as used being substantially liquid with a low surface tension, spreads quickly, widely, and thinly over the surface of the metal work and the tool. A close contact between the coolant and surfaces of parts to be cooled is thereby secured, and thus the coolant occupies a favorable position for absorbing the heat generated in the machine operation. The fluidity of the coolant, coupled with its spreading properties, is effective to wash away, as formed, the metallic scraps or particles that ordinarily, or otherwise, accumulate under the tool cutting edge, or grinding element and which if not removed cause abrasions to the surface being machined. Greater smoothness or polish of the finished work, as well as more accurate work, are thus possible with the use of this invention. In brief, the coolant by reason of its unusual cooling power, enables all types of machinery and tooling operations, including feeding operations, to be substantially speeded-up without the increased speed developing excessive temperatures in either the tools or work and without injury to the tool or work.

In addition to the enumerated advantages of the present coolant, it has other characteristics which make it well suited for general use. The coolant is free of offensive odor. The coolant is not injurious to the skin in the event that it comes in contact with the hands or face of mechanics. As a matter of fact, the wax-containing coolant of this invention has an emollient or smoothing effect upon the skin; and any part thereof remaining on the skin is readily removed by the simple application of water, and without the use of a detergent.

In accordance with the present invention a normally solid, readily fusible organic substance preferably a crystalline substance is dispersed in an aqueous medium. The invention is not dependent upon the use of any particular substance since any one of a large number of substances having a wide diversity of specific properties may be employed, provided the substance is one which is substantially insoluble in water, is solid at normal temperatures, is readily fusible, as for example, at the temperatures between about 40° C. and about 100° C. so that it is capable of changing from the solid to the liquid phase at temperatures of this order of magnitude and is capable of dispersion in an aqueous medium, as for example by the use of a dispersing agent. It is not the specific chemical structure of the compound which is important because the phenomena characteristic of the invention are physical rather than chemical in nature as will be presently more apparent. To illustrate the wide diversity of chemical structure of compounds which may be employed in embodiments of the present invention, there may be mentioned the various waxes, such as, paraffin wax, carnauba wax, montan wax, ceresin wax, and the like, paradichloro benzene, naphthalene, thymol, camphor, and many other organic substances. By water insolubility is meant not necessarily absolute insolublity since absolute insolubility is more or less rare. What is meant is a compound having at the most only slight solubility. There are many compounds which are readily fusible but which are so highly soluble in aqueous media that they cannot be suspended and remain in suspension. The compounds of the present invention must not only be capable of dispersion and suspension in water but also the ability to remain in suspension. The solubility of the compounds must therefore be of a very limited nature in order to meet these requirements. Having stated the criteria and given various examples of such compounds, those skilled in the art will have no difficulty in understanding the scope of compounds which meet the stated criteria. The concentration of total solids in the suspension when used as coolant may vary considerably but is preferably small, as for example, of the order of two thousandths to seven tenths per cent by weight. A dispersing agent is usually necessary to bring about the dispersion and particularly to maintain the particles in dispersed condition as a suspensoid which, at least in many cases, will show an active Brownian movement.

When the suspended particles of the dispersion are brought within the zone or area of influence of a heated area, as for example, within the zone where heat is generated by the action of a cutting or grinding tool upon a metallic or other resistant surface, a peculiar phenomenon occurs. There is a change of the particles from the solid to the liquid phase. The suspended microscopic or submicroscopic particles in their normally dispersed condition have a characteristic shape which varies with the nature of the specific substance. In the case of paraffin wax, the particles or at least many of them have an oval or disc shape with a depression in the center. When the dispersed particles are brought into said zone and exposed to the heat generated by the action of cutting or grinding or other heat generating cause, there is a change not only in phase but also in shape since the fused liquid particles assume a globular or spheroidal shape. Accompanying these changes in phase and shape there is imparted to the particles an energetic movement, in addition to any movement already possessed thereby. In this new movement the particles are driven away from the heated zone and a condition of turbulence is set up. The effect can be visualized by drawing an analogy. If there is a local application of heat to a mass of liquid in a container as for example by directing a small flame at the side or bottom of a flask or container containing a considerable volume of water, a certain length of time will be required to raise the temperature of the mass of water any given amount if the water is quiescent during the application of heat. On the other hand, if the same conditions are maintained except that the water is agitated then the time required to reach the same temperature of the same mass of water will be substantially less.

In cutting and grinding operations, it would hardly be practical to effect efficient mechanical agitation of the cutting liquid at the zone where heat is developed, assuming that such agitation would effect adequate cooling.

The present invention however makes possible internal phenomena involving heat absorption and heat transfer which rapidly and efficiently transfer heat from the spot where it is generated and distribute that heat in the mass of aqueous liquid employed as coolant. The melted particles absorb heat equivalent to the heat of fusion thereof in contact with the hot zone from which they are driven away to cooler parts of the liquid where the solid phase is regenerated with the liberation of said heat of fusion. The particles thus act as heat absorbers and heat carriers.

Moreover, in addition to the heat absorption effect the movement of the particles and the resulting turbulence of the aqueous liquid also assists in carrying heat away from the hot zone and dissipating it throughout the mass of liquid.

The reason for the peculiar motion of the particles above described may be attributed to various causes and a number of theories evolved to explain this movement. Whatever the theory may be, however, the fact remains that there is a change in phase and shape of the particles accompanied by the acquisition of energy manifested in an energetic movement of said particles away from the hot zone.

As far as known, the observed phenomena are purely physical in nature. There is no observed chemical change in the dispersed particles since the same body of dispersion or coolant may be used over and over again.

As is well known, the total surface area of finely divided dispersed particles is very large per unit volume, and the smaller the size of the particles, the larger is the total area. The fact that this large surface area of fusible particles is continuously swept into and then propelled out of contact with the heat-generating zone contributes to the unique cooling action.

The invention therefore provides what in effect is an unlimited source of heat absorption and dissipation continuously presented to the heat generating zone in a cyclical process. The temperature of the coolant is such that the liquefied particles are solidified, after passing beyond from the heat-generating zone. In this resolidification heat is of course liberated equal in fact to the heat absorbed on fusion. However, such heat does not cause the temperature of the coolant to rise above the melting point of the dispersed particles partly because of the high specific heat of the aqueous phase and partly because the heat liberated upon solidification of the fused particles is readily removed, e. g., by radiation or otherwise.

For commercial purposes, it is of course undesirable to transport and pay shipping charges on large quantities of aqueous liquid having a minor proportion of solid material and it is therefore preferable to provide a concentrate which upon dilution will yield the desired coolant. Even where the ultimate dispersion is made at the point of consumption, it may be desirable first to prepare a concentrate and then dilute it rather than attempt to make the ultimate dispersion directly although the latter procedure may be adopted and practiced.

In addition to providing a coolant having the fundamental properties and characteristics above set forth, the invention also includes the provision of concentrates and coolants, the properties of which are stable. This provision has been found particularly desirable where one is dealing with a number of hard waters commonly met with in various localities. Coolants made from certain types of hard waters as the dispersion media have been found to lack stability. In dealing with relatively pure or distilled water, dispersing agents in general may be employed; however, since it is desirable to provide a concentrate which may be of uniform composition and adapted for use in localities where the hardness of the water may vary substantially, it has been found desirable to provide a concentrate which upon dilution with any generally available kind of water will yield a stable coolant and for this purpose the invention provides certain kinds of dispersing agents, and certain kinds of stabilizing agents.

In order to obtain the dispersion, a dispersing agent is preferably used. This is preferably a sulfonated oil, e. g., a water soluble sulfonated hydrocarbon or mixture of hydrocarbons, e. g., a sulfonated mineral oil, although other dispersing agents may be used, e. g., diglycol laurate.

In accordance with the invention there is also preferably employed a stabilizer in addition to the dispersed solid and dispersing agent. In making the dispersion, it is first preferably made in the form of a concentrate, i. e., a dispersion containing a high concentration, say 10 to 30% by weight of disperse phase and dispersing plus stabilizing agents, and the balance water. The concentrate may be marketed as such and diluted, for use, with water. The extent of dilution will vary greatly depending on the kind of use to which the coolant is put, e. g., dilutions varying from 10 fold to 400 fold.

Among the stabilizing agents the higher fatty acids in general and their corresponding alcohols and amides and nitriles may be used. These substances are essentially paraffin hydrocarbons having in the molecule polar hydrophilic groups, e. g., —COOH, —OH, —CONH$_2$ or —CN.

In general the invention employs as a stabilizer for the diluted concentrate, the higher fatty acids and functional derivatives thereof, e. g., the corresponding alcohols, amides and nitriles of said acids. The esters or glycerides containing free fatty acids may also be used.

In addition to the use of an agent which stabilizes the ultimate dispersion or diluted concentrate, there is also preferably incorporated with the concentrate an agent which stabilizes the concentrate, i. e., prevents "creaming," i. e., the separation of the concentrate into parts or layers having different concentrations of components. It has been found that sulfurized glycerides, e. g., sulfurized lard oil performs a stabilizing function of this character and also contributes to the stability of the diluted concentrate.

In general, as a stabilizer primarily for the concentrate, the invention employs the sulfurized higher fatty acids, the sulfurized functional derivatives of said fatty acids, e. g., the sulfurized corresponding alcohols, amides and nitriles and the sulfurized esters, e. g., glycerol esters of said fatty acids.

In addition to the above components certain other agents may be added including an alkyl sulfate of a higher alcohol, to improve the "wetting" properties, a bactericide, an anti-freeze agent, e. g., glycerol or glycol, and a rust inhibitor, e. g., chromate salts or tricresyl phosphate. The latter also improves the metal working properties of the composition.

The following formula of a concentrate illustrates the principles above described:

| Component | | Parts by Weight | Percent | Illustrative Ranges of Percent |
|---|---|---|---|---|
| Generic | Specific | | | |
| Heat absorbing and dissipating solid. | Paraffin Wax | 30 | 8.8 | 6 to 25 |
| Dispersing agent | Sulfonated mineral oil | 25 | 7.8 | 5 to 20 |
| Stabilizing agent: | | | | |
| (a) for the coolant in dilute form. | Fatty acids and functional derivatives. | 10 | 3.0 | 1 to 5 |
| (b) against "creaming" of the concentrate. | Sulfurized fatty acids and glycerides. | 5 | 1.5 | 0.25 to 3 |
| Dispersion medium | Water | 250 | 78.9 | 75 to 50 |

In this formula the paraffin wax may be replaced by any other substance meeting the stated criteria, e. g., paradichlorbenzene, naphthalene, thymol, camphor, etc. Sulfonated mineral oil has been found best adapted as a dispersing agent to give a coolant of maximum stability where hard water is used as the dispersing medium in conjunction with a stabilizing agent although other dispersing agents may be used, particularly in cases where stability is not important or where the available water is such that the problem of securing stability is not encountered. When higher alcohols e. g. of the alkane series such as stearyl alcohol, lauryl alcohol, etc. are used as stabilizing agents, it has been found that stabilization is effected not only of the concentrate but also of the diluted concentrate or coolant. In such case the sulfurized fatty acids may be omitted from the above formula.

In making the concentrate, the substance to be dispersed and dispersing agent may be heated in separate vessels to a temperature somewhat above the melting point of said substance. The heated substance to be dispersed and dispersing agent are then mixed and the water added and the whole subjected to high speed stirring to obtain the desired dispersion. During this mixing the stabilizer or stabilizers are added together with any or all of the additional agents above mentioned. The pH of the concentrate is preferably adjusted at 7 to 9.

In use the concentrate is diluted with water to which there is preferably added a buffer, e. g., borax or other suitable salt which stabilizes the pH on dilution and also acts as a rust inhibitor.

While the concentrate may be diluted to produce varying concentrations of the dispersed particles, it is preferred in general that in the diluted coolant as used the concentration of said dispersed particles by weight should be not over 5% by weight and may desirably even be less, e. g., 0.002 to 1.0% by weight

What is claimed is:

1. A cutting fluid concentrate having a continuous aqueous phase and a disperse phase comprising about 8.8% by weight of a normally solid paraffin wax with a melting point lower than 100° C., about 7.8% by weight of a water-soluble sulphonated oil as a dispersing agent and about 3.0% by weight of stearyl alcohol as a stabilizing agent, said concentrate being adapted to be diluted with water to a wax content of the order of .7% to .002% by weight to form a coolant for operations such as cutting, grinding and the like.

2. A cutting fluid concentrate having a continuous aqueous phase and a disperse phase comprising from 6% to 25% by weight of a normally solid paraffin wax with a melting point lower than 100° C., from 5% to 25% of a water-soluble sulphonated oil as a dispersing agent and from 1% to 5% by weight of stearyl alcohol as a stabilizing agent, the total quantity of said dispersing agent and stabilizing agent being at least as great as the quantity of said wax and the quantity of said stabilizer being less than half the quantity of said dispersing agent to prevent the deposition of a hard material when said aqueous phase evaporates, said concentrate being adapted to be diluted with water to a wax content of the order of .7% to .002% by weight to form a coolant for operations such as cutting, grinding and the like.

3. A coolant composition for operations such as cutting, grinding and the like, said coolant having a continuous aqueous phase and a disperse phase comprising between .7% and .002% by weight of a normally solid paraffin wax with a melting point lower than 100° C., between .6% and .0017% by weight of a water-soluble sulphonated oil as a dispersing agent and between .2% and .0007% by weight of stearyl alcohol as a stabilizer, the quantity of said stabilizer being less than half the quantity of said dispersing agent and the total quantity of said dispersing agent and stabilizer being at least as great as the quantity of said wax to prevent deposition of a hard material when said aqueous phase evaporates.

4. A coolant composition for operations such as cutting, grinding and the like, said coolant having a continuous aqueous phase and a normally solid disperse phase, the particles of said disperse phase being in colloidal condition and exhibiting a Brownian movement, the disperse phase comprising a normally solid paraffin wax having a melting point lower than 100° C., a water-soluble sulphonated oil dispersing agent for dispersing said wax into said colloidal condition and a stabilizing agent which is stearyl alcohol to maintain the stability and homogeneity of said colloidal dispersion, the quantity of said stabilizing agent being less than half the quantity of said dispersing agent and the total quantity of dispersing agent and stabilizing agent in said composition being at least as great as the quantity of said wax to prevent the deposition of a hard material when said aqueous phase evaporates.

5. A coolant composition for operations such as cutting, grinding and the like, said coolant having a continuous aqueous phase and a normally solid disperse phase, the particles of said disperse phase being in colloidal condition and exhibiting a Brownian movement, the disperse phase comprising a normally solid paraffin wax having a melting point lower than 100° C., a water-soluble sulphonated oil dispersing agent for dispersing said wax into said colloidal condition and a stabilizing agent which is lauryl alcohol to maintain the stability and homogeneity of said colloidal dispersion, the quantity of said stabilizing agent being less than half the quantity of said dispersing agent and the total quantity of dispersing agent and stabilizing agent in said composition being at least as great as the quantity of said wax to prevent the deposition of a hard material when said aqueous phase evaporates.

6. A coolant composition for operations such as cutting, grinding and the like, said coolant having a continuous aqueous phase and a normally solid disperse phase, the particles of said disperse phase being in colloidal condition and exhibiting a Brownian movement, the disperse phase comprising a normally solid paraffin wax having a melting point lower than 100° C., a water-soluble sulphonated oil dispersing agent for dispersing said wax into said colloidal condition and a stabilizing agent which is a higher fatty alcohol to maintain the stability and homogeneity of said colloidal dispersion, the quantity of said stabilizing agent being less than half the quantity of said dispersing agent and the total quantity of dispersing agent and stabilizing agent in said composition being at least as great as the quantity of said wax to prevent the deposition of a hard material when said aqueous phase evaporates.

7. A coolant composition for operations such as cutting, grinding and the like, said coolant having a continuous aqueous phase and a normally solid disperse phase, the particles of said disperse phase being in colloidal condition and exhibiting a Brownian movement, the disperse phase comprising a normally solid paraffin wax having a melting point lower than 100° C., a water-soluble sulphonated oil dispersing agent for dispersing said wax into said colloidal condition and a stabilizing agent which is a higher fatty acid to maintain the stability and homogeneity of said colloidal dispersion, the quantity of said stabilizing agent being less than half the quantity of said dispersing agent and the total quantity of dispersing agent and stabilizing agent in said composition being at least as great as the quantity of said wax to prevent the deposition of a hard material when said aqueous phase evaporates.

8. A coolant composition for operations such as cutting, grinding and the like, said coolant having a continuous aqueous phase and a normally solid disperse phase, the particles of said disperse phase being in colloidal condition and exhibiting a Brownian movement, the disperse phase comprising a normally solid paraffin wax having a melting point lower than 100° C., a water-soluble sulphonated oil dispersing agent for dispersing said wax into said colloidal condition and a stabilizing agent which is selected from the group consisting of higher fatty acids and their corresponding alcohols, amides and nitriles to maintain the stability and homogeneity of said colloidal dispersion, the quantity of said stabilizing agent being less than half the quantity of said dispersing agent and the total quantity of dispersing agent and stabilizing agent in said composition being at least as great as the quantity of said wax to prevent the deposition of a hard material when said aqueous phase evaporates.

9. A coolant composition for operations such as cutting, grinding and the like, said coolant having a continuous aqueous phase and a normally solid disperse phase, the particles of said disperse phase being in colloidal condition and exhibiting a Brownian movement, the disperse phase comprising a normally solid paraffin wax having a melting point lower than 100° C., a water-soluble sulphonated oil dispersing agent for dispersing said wax into said colloidal condition and a stabilizing agent which is stearyl alcohol to maintain the stability and homogeneity of said colloidal dispersion.

ROBERT T. HANCE.
HAROLD C. O'BRIEN, Jr.

REFERENCES CITED

The following references are of record in the file of this patent:

UNITED STATES PATENTS

| Number | Name | Date |
|---|---|---|
| 1,317,617 | De Cew | Sept. 30, 1919 |
| 1,874,956 | Gallsworth | Aug. 30, 1932 |
| 1,913,299 | Abrams | June 6, 1933 |
| 1,913,300 | Abrams | June 6, 1933 |
| 2,015,865 | Muller | Oct. 1, 1935 |
| 2,043,962 | Kauffman | June 9, 1936 |
| 2,058,344 | Moran | Oct. 20, 1936 |
| 2,097,085 | Fabian | Oct. 26, 1937 |
| 2,199,146 | Williams | Apr. 30, 1940 |
| 2,238,109 | Griesinger | Apr. 15, 1941 |
| 2,265,799 | Carlson | Dec. 9, 1941 |
| 2,318,558 | Pabst | May 4, 1943 |
| 2,338,522 | Liberthson | Jan. 4, 1944 |
| 2,340,035 | Zimmer | Jan. 25, 1944 |
| 2,340,846 | Landes | Feb. 1, 1944 |
| 2,346,124 | Dew | Apr. 4, 1944 |